June 20, 1933.    R. G. THOMPSON    1,914,705
TYPEWRITING MACHINE
Filed June 15, 1931    2 Sheets-Sheet 1

INVENTOR
RUSSELL G. THOMPSON
BY Harold E. Stonebraker
ATTORNEY

June 20, 1933.  R. G. THOMPSON  1,914,705
TYPEWRITING MACHINE
Filed June 15, 1931  2 Sheets-Sheet 2

INVENTOR
RUSSELL G. THOMPSON
Harold E. Stonebraker,
ATTORNEY

Patented June 20, 1933

1,914,705

UNITED STATES PATENT OFFICE

RUSSELL G. THOMPSON, OF ROCHESTER, NEW YORK, ASSIGNOR TO ELECTROMATIC TYPEWRITERS, INC., OF ROCHESTER, NEW YORK, A CORPORATION OF NEW YORK

TYPEWRITING MACHINE

Application filed June 15, 1931. Serial No. 544,343.

This invention relates to improvements in typewriting machines, and particularly to power driven machines in which the power is supplied by an electric motor.

The principal object of the invention is to provide means for controlling the speed of a variable speed motor and hence the speed of travel of the carriage while it is being returned to begin a new line of writing or during other operations of the machine, which it is desirable to operate at a speed different from the ordinary printing operations.

Another object of the invention is to provide means for automatically controlling the speed of the motor by controlling its field circuit.

More specifically, the object of the invention is to provide an auxiliary switch and auxiliary resistance for controlling the motor, and means controlled by the carriage return devices for operating said auxiliary switch.

To these and other ends, the invention consists in the construction and arrangement of parts that will appear from the following description when read in conjunction with the accompanying drawings, the novel features being pointed out in the claims at the end of the specification.

Figure 1:
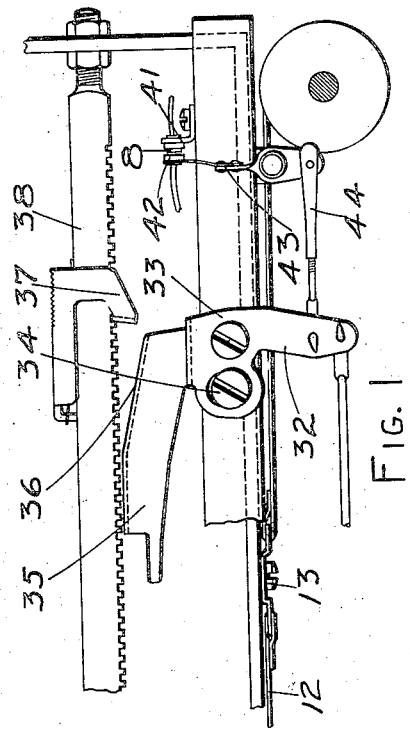
Fig. 1 is a fragmentary rear elevation of one end of a typewriter frame and carriage thereon illustrating one possible application of the invention.
Figure 3:
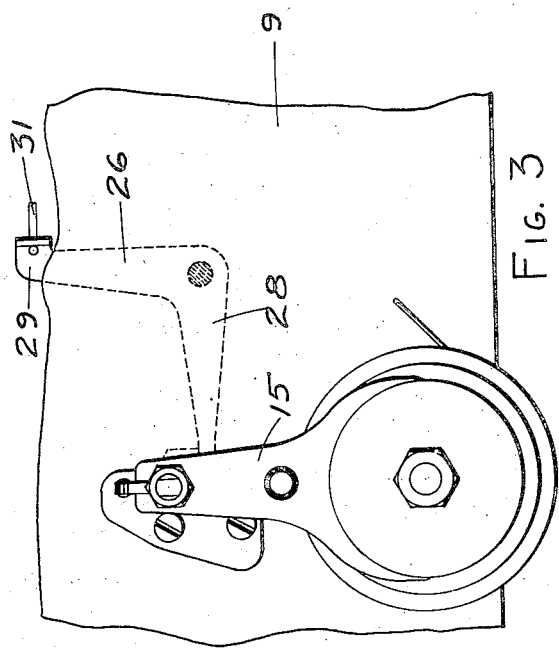
Fig. 3 is an end elevation of the same.

Referring to the drawings, and particularly to Figs. 1 to 4, in which like reference numerals refer to the same part in all views, 1 is a power driven roller operatively connected with the shaft of a variable speed electric motor 2. The motor 2 is arranged in the electric circuit 3 controlled by the main switch 4, and having a shunt field 5. Arranged in the shunt field 5 is a main resistance 6 which is adjustable to control the current through the shunt and hence through the motor to secure a proper normal speed of the latter. An auxiliary resistance 7 is also arranged in the shunt field circuit so that it may be shunted out of said circuit by means of an auxiliary switch 8. It will be understood that increasing the resistance in the shunt field 5 increases the voltage across the armature and consequently its speed; likewise decreasing the resistance in the shunt decreases the voltage across the armature and consequently its speed. When the switch 8 is closed to shunt the resistance 7, the resistance in the shunt field is decreased, thus decreasing the voltage across the armature and hence its speed. The resistance 7 may also be adjustable so that the effect of closing the switch 8 may be accurately determined.

The shaft of the power roller 1 has a bearing in the frame member 9, and loosely mounted on said shaft outside of said frame member is a spool 11 to which one end of a tape 12 is secured, the other end of said tape being secured to the carriage at 13. Normally, the tape feeds from the spool during letter space movements of the carriage, but when the spool is driven in a reverse direction, the tape is wound thereon to return the carriage. Key controlled means of well known construction are provided for connecting the spool with the power roller to be driven thereby.

Figure 2:
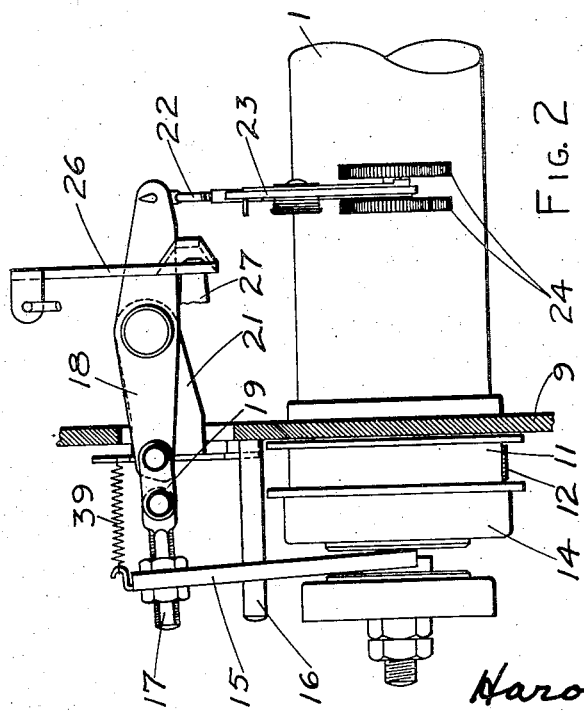
Fig. 2 is a fragmentary elevation of the power driven roller and carriage return devices applied thereto.
Figure 4:
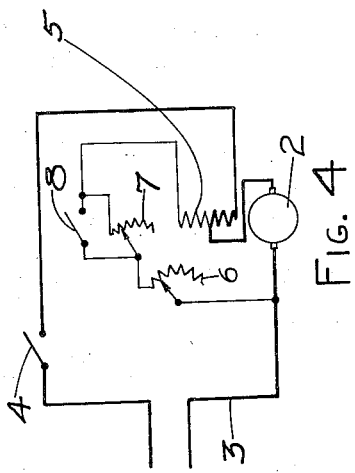
Fig. 4 is a diagram of the electric circuit with compound-wound motor.

Said means comprises a clutch 14 operatively engaged by a clutch actuator 15 bifurcated at its lower end to straddle the power roller shaft and loosely mounted on an arm 16 projecting laterally from the frame member 9. At its upper end, an arm or post 17 is adjustably secured in the actuator 15 and connected with a toggle lever 18 by means of a link 19. The lever 18 is arranged in an opening in the frame member 9, and pivoted on a bracket 21 projecting inwardly through said opening. In Fig. 2, the lever 18 is shown in position to straighten the toggle and the actuator 15 moved to a position to connect the spool 11 with the power roller to be driven thereby.

A link 22 connects the inner end of the lever 18 with a bell crank 23 adapted to be operated by the cams 24 which are movable into engagement with the power driven roller by key controlled means in a well known manner. The cams 24, under the action of the power roller, operate to swing the bell crank in a direction to pull the link 22 downwardly to swing the lever 18 in a direction to straighten the toggle to connect the spool with the power roller to be rotated thereby.

Means are provided for breaking the toggle and releasing the spool from driving connection with the power roller when the carriage approaches the limit of its movement in the return direction. To this end, a bell crank lever 26 pivoted on a bracket 27 projecting inwardly from the frame member 9 has an arm 28 engaging the inner arm of the lever 18 and an arm 29 connected by the link 31 with an arm 32 of a lever 33 pivoted on the frame of the machine and limited in its movements by a screw or stud 34 which engages an elongated opening or slot in the lever. The lever 33 has an arm 35 projecting upwardly and to the left, as seen in Fig. 1 of the drawings, which is provided with an upwardly inclined edge or cam 36 which moves into and out of the path of the stop 37 adjustably mounted on the rack 38 arranged on the carriage. The stop 37 may be the usual margin stop, and engages the cam 36 to release the carriage from driving connection with the driven roller and permits the carriage to continue its movement under the action of inertia until its margin stop engages the fixed carriage stop. In order to insure a rapid disengagement of the clutch devices when the toggle is broken, the upper free end of the actuator 15 may be resiliently connected with a fixed part on the frame by means of a spring 39.

Means are provided for operating the switch 8 to control the motor speed when the carriage is being returned, said means being actuated automatically when the clutch is operated to connect or disconnect the spool 11 with the power roller. To this end, one contact 41 of the switch 8 is fixedly mounted conveniently on the frame. A cooperating contact 42 is mounted on one arm of a lever 43 pivoted on the frame and having its other arm connected with the lever 33 by means of a link 44. When the lever 18 is actuated to close the clutch to connect the spool with the power roller, the bell crank 26 is actuated to swing the lever 33 in a direction to close the normally open switch 8 while the motor operates to return the carriage, thereby "shorting" the auxiliary resistance 7 in the shunt field 5, which has the effect of reducing voltage across the armature, causing it to slow up its speed. When the stop 37 on the carriage has moved to engage the arm 35 of the lever 33, it swings said lever in a reverse direction to disconnect the spool from its driving connection with the power roller and simultaneously swings the lever 43 in a direction to move its contact 42 away from the fixed contact 41 to open the switch 8, and again throwing the resistance 7 into the shunt field 5 to increase the voltage across the armature, causing it to increase its speed.

Figure 5:
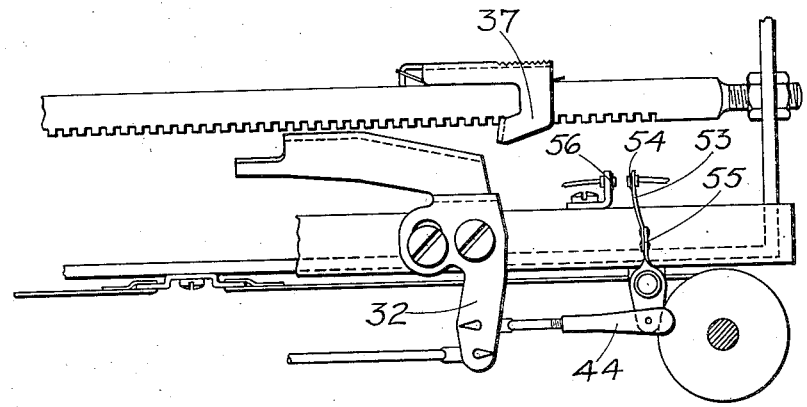
Fig. 5 is a view similar to Fig. 1 illustrating a modified embodiment of the invention.
Figure 6:
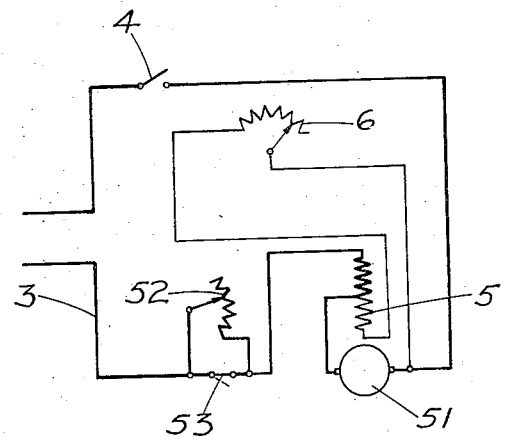
Fig. 6 is a diagram of the electric circuit associated therewith.

Referring now to the embodiment illustrated in Figs. 5 and 6, a variable speed motor 51 of the compound type is shown having a variable resistance in a shunt field 5. A variable auxiliary resistance 52 is arranged in series with the motor 51 and normally shunted by means of the switch 53. It will be noted that in this embodiment, the auxiliary resistance 52 is thrown in series with the motor when the switch 53 is opened, and operates to reduce the voltage across the armature, resulting in a corresponding decrease in the motor speed. The operation of the switch 53 is substantially the same as the operation of the switch 8, except that the switch 53 is normally closed and is automatically opened when the carriage is returned to reduce the motor speed. The switch 53 comprises a contact 54 mounted on an arm 55 pivoted on a fixed part and engageable with a cooperating contact 56 also mounted on a fixed part of the machine. The arm 55 is operatively connected with the link 44. When the carriage return devices are operatively connected with the power driven roller, the link 44 is actuated to swing the arm 55 and move its contact 54 away from the fixed contact 56, thus opening the switch and throwing the auxiliary resistance 52 into the circuit to reduce the motor speed. When the carriage approaches the limit of its return movement, the margin stop actuates the arm 32 to again close the switch to shunt the auxiliary resistance.

In a power operated typewriting machine, it is desirable that the power devices be operated at a substantially uniform speed when the type bars are being actuated thereby, so that uniformly heavy impressions may be made on the work sheet. It is also desirable that the carriage be returned at a comparatively slower speed to avoid the shock and noise caused by the interengagement of the carriage stops. By the arrangement herein described, the motor speed may be rapidly reduced when the carriage is returned. Two factors tend to reduce its speed at this time, reduced voltage due to the closing of the switch 8 or opening of the switch 53, and the increased load of moving the carriage against the tension of its spring. It is also desirable to speed the motor up rapidly to its original or normal speed when the carriage reaches the end of its return movement, so that the types may again impress the work sheet with the same force as before the carriage return operation. By the arrangement described, the carriage load is released from the motor before it reaches the limit of its return movement, thus giving the motor an opportunity to recover its speed before the carriage comes to rest, but the switch 8 is again opened or the switch 53 again closed, thus increasing the voltage to the motor armature.

This invention is useful in a power driven machine whenever it is necessary or desirable to perform one operation at a different speed than another or when one operation may require greater application of power for its performance, as when a long heavy bookkeeping carriage is returned against the tension of a heavy motor drum. By the arrangement shown and described herein, it is possible to so adjust the power of the motor that the desired carriage speed may be secured.

Although only two embodiments of the invention are shown and described herein, it will be understood that this application is intended to cover such other changes or modifications thereof as come within the spirit of the invention or scope of the following claims.

I claim:

1. In a power operated typewriting machine, the combination with a frame, of a roller revolubly mounted in said frame, a motor for driving said roller, a carriage movable on said frame for letter spacing, key operated means for operatively connecting the carriage with the driven roller to return it to begin a new line, and means automatically actuated by said key operated means for controlling the speed of the motor.

2. In a power operated typewriting machine, the combination with a frame, a driven roller and an electric motor for driving said roller, a shunt field circuit in the circuit of said motor, a resistance in said shunt circuit, a switch for shorting said resistance to vary the speed of the motor, key controlled means for operatively connecting a driven part with said power driven roller, and means operated automatically by said key controlled means for actuating said switch to vary the speed of said motor.

3. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame, key controlled means for operatively connecting said carriage with said driven roller to be moved thereby, means operated automatically by said key controlled means for closing said switch, means for releasing the carriage from said driven roller, and means operatively connected with said carriage releasing means for opening said switch.

4. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame for letter spacing, key controlled means for operatively connecting the carriage with said driven roller for returning it to begin a new line, means operatively connected with said key controlled means for closing said switch, and means operated by the movement of the carriage for releasing it from said driven roller and opening said switch.

5. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame for letter spacing, key controlled means for operatively connecting the carriage with said driven roller for returning it to begin a new line, a lever operatively connected with said key controlled means and operable to close said switch when the carriage is connected with said driven roller, and means on the carriage for actuating said lever to open said switch.

6. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame for letter spacing, key controlled means for operatively connecting the carriage with said driven roller for returning it to begin a new line, a lever operatively connected with said key controlled means for closing said switch when the carriage is connected with said driven roller, a stop on the carriage for actuating said lever to open said switch, and means operatively connected with said lever for releasing the carriage from said driven roller.

7. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame for letter spacing, key controlled means for operatively connecting the carriage with said driven roller for returning it to begin a new line, a stop on the carriage, a lever on the frame normally out of the path of movement of said stop, means connecting said lever with said key controlled means for swinging the lever into the path of movement of said stop when the carriage is connected with said driven roller, and means connecting said lever with said switch for closing the switch when the lever is operated by said key controlled means and opening the switch when the lever is operated by said stop.

8. In a power operated typewriting machine, the combination with a frame, a driven roller and an electric motor for driving said roller, of a shunt field circuit in the circuit of said motor, a resistance in said shunt circuit, a switch for shunting said resistance to vary the speed of said motor, a carriage movable on said frame for letter spacing, key controlled means for operatively connecting the carriage with said driven roller for returning it to begin a new line, a stop on the carriage, a lever on the frame, a cam on said lever normally out of the path of movement of said stop, means connecting said lever with said key controlled means for swinging the lever to project its cam into the path of said stop when the carriage is connected with said driven roller, and means connecting said lever with said switch for closing the switch when the lever is operated by said key controlled means and for opening the switch when moved by the engagement of its cam with said stop.

9. In a power operated typewriting machine, the combination with a frame, a driven roller and an electric motor for driving said roller, of a variable resistance in shunt with said motor and operable to increase the motor speed when the resistance is increased or reduce its speed when the resistance is reduced, a switch for shorting said resistance to increase the speed of the motor to its limit, and key controlled means for operating said switch.

10. In a power operated typewriting machine, the combination with a frame, a driven roller and an electric motor for driving said roller, of a variable resistance in shunt with said motor and operable to increase the motor speed when the resistance is increased or reduce its speed when the resistance is reduced, a switch for shorting said resistance to increase the speed of the motor to its limit, a carriage movable on said frame for letter spacing, key controlled means for operatively connecting said carriage with said driven roller for returning the carriage to begin a new line, and means actuated by said key controlled means for operating said switch.

11. In a power operated typewriting machine, the combination with a frame, a driven roller and an electric motor for driving said roller, of a resistance in the circuit of said motor, a normally closed switch for shunting said resistance, a carriage movable on said frame, key controlled means for operatively connecting said carriage with said driven roller to be moved thereby, means operated by said key controlled means for opening said switch, and means controlled by the movement of the carriage for closing said switch.

12. In a power operated typewriting machine, the combination with a frame, a driven roller and an electric motor for driving said roller, of a resistance in the circuit of said motor, a normally closed switch for shunting said resistance, a carriage movable on said frame, key controlled means for operatively connecting said carriage with said driven roller to be moved thereby, a lever operatively connected with said key controlled means and operable to open said switch when the carriage is connected with said driven roller to reduce the speed of the motor, and means on the carriage for actuating said lever to close the switch when the carriage approaches the limit of its movement.

In witness whereof, I have hereunto signed my name.

RUSSELL G. THOMPSON.